US008001117B2

(12) United States Patent
Yahia et al.

(10) Patent No.: US 8,001,117 B2
(45) Date of Patent: Aug. 16, 2011

(54) EFFICIENT ONLINE COMPUTATION OF DIVERSE QUERY RESULTS

(75) Inventors: Sihem Amer Yahia, New York, NY (US); Jayavel Shanmugasundaram, Santa Clara, CA (US); Utkarsh Srivastava, Santa Clara, CA (US); Erik Vee, San Jose, CA (US); Prashanth Bhat, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 238 days.

(21) Appl. No.: 11/750,871

(22) Filed: May 18, 2007

(65) Prior Publication Data

US 2008/0288480 A1    Nov. 20, 2008

(51) Int. Cl.
*G06F 7/00* (2006.01)
(52) U.S. Cl. .......................... 707/728; 707/765; 707/771
(58) Field of Classification Search .................... None
See application file for complete search history.

(56) References Cited

U.S. PATENT DOCUMENTS

| | | | |
|---|---|---|---|
| 2004/0193582 A1* | 9/2004 | Smyth | 707/3 |
| 2005/0210042 A1* | 9/2005 | Goedken | 707/100 |
| 2005/0222981 A1* | 10/2005 | Lawrence et al. | 707/3 |
| 2006/0031214 A1* | 2/2006 | Solaro et al. | 707/4 |
| 2006/0155694 A1* | 7/2006 | Chowdhury et al. | 707/4 |
| 2007/0288498 A1* | 12/2007 | Dietz et al. | 707/102 |
| 2007/0294225 A1* | 12/2007 | Radlinski et al. | 707/3 |

OTHER PUBLICATIONS

"The American Heritage New Dictionary of Cultural Literacy, Third Edition," Houghton Mifflin Company, 2005 <http://www.dictionary.com>.*
"The American Heritage New Dictionary of Cultural Literacy, Third Edition," Houghton Mifflin Company, 2005.*
A.Z. Broder, D. Carmel, M. Herscovici, A.Soffer, J.Y. Zien, *Efficient query evaluation using a two-level retrieval process*, cikm 2003.
N. Bruno, S. Chaudhuri, L. Gravano, *Top-K Selection Queries Over Relational Databases: Mapping Strategies and Performance Evaluation*, ACM Transactions on Database Systems (TODS), 27(2), 2002, pp. 153-187.
J. Carbonell and J. Goldstein, *The use of MMR, diversity-based reranking for reordering documents and producing summaries*, SIGIR 98.
M.J. Carey, D. Kossmann, *On Saying "Enough Already?" in SQL*, SIGMOD Conference 1997.
F.C. Chu, J.Y. Halpern, P. Seshadri, *Least Expected Cost Query Optimization: An Exercise in Utility*, PODS Conference 1999.
*Introduction to Dewey Decimal Classification*, Online Computer Library Center, http://www.oclc.org/dewey/about/about_the_ddc.htm.
D. Donjerkovic, R. Ramakrishman, *Probabilistic Optimization of Top N Queries*, VLDB Conference 1999.

(Continued)

*Primary Examiner* — Tim T. Vo
*Assistant Examiner* — Aaron Sanders
(74) *Attorney, Agent, or Firm* — Brinks Hofer Gilson & Lione

(57) ABSTRACT

The system includes a query engine and an advertisement engine. The query engine is configured to receive a query from the user. The advertisement engine generates advertisement results corresponding to the query. The advertisement results are selected from entries in an advertisement database, where the entries include predicate values corresponding to a domain. The advertisement engine generates a diverse advertisement result that is a subset of the database entries that match the query. The diversity result varies at least one predicate by selecting entries for the list that include a proportional representation of each available predicate value in the database that matches the query.

12 Claims, 10 Drawing Sheets

OTHER PUBLICATIONS

R. Fagin, A. Lotem, M. Naor, *Optimal Aggregation Algorithms for Middleware*, PODS Conference 2001.

R. Fagin, *combining Fuzzy Information from Multiple Systems*, PODS Conference 1996.

L. Guo, F. Shao, C. Botev, J. Shanmugasundaram, *XRANK: Ranked Keyword Search over XML Documents*, SIGMOD Conference 2003.

V. Hristidis, N. Koudas, Y. Papakonstantinou, *PREFER: A system for the Efficient Execution of Multiparametric Ranked Queries*, SIGMOD Conference 2001.

A. Halverson et al., *Mixed Mode XML Query Processing*, VLDB 2003.

J.M. Hellerstein, P.J. Haas, H.J. Wang, *Online Aggregation*, SIGMOD Conference 1997.

R. Kaushik, R. Krishnamurthy, J. Naughton, R. Ramakrishnan, *On the Integration of Structure Indexes and Inverted Lists*, ICDE Conference 2004.

G. Koutrika, A. Simitsis, Y. Ioannidis, *Précis: The Essence of a Query Answer*, ICDE Conference 2006.

C. Li, K. Chen-Chang, I. Ilyas, S. Song, *RankSQL: Query Algebra and Optimization for Relational Top-k Queries*, SIGMOD Conference 2005.

\* cited by examiner

EFFICIENT ONLINE COMPUTATION OF DIVERSE QUERY RESULTS

BACKGROUND

1. Field of the Invention

The present invention generally relates to a system and method for generating a list of advertisements with diverse results.

2. Description of Related Art

Online shopping is gaining increasing popularity due to its convenience and the large inventory of accessible listings on the Web. Users may be provided with a form interface where they can specify a search query as a combination of values and keywords on pre-defined fields. Due to the limited "real-estate" on a Web page, only the most relevant search results are shown to users. However, this constraint often limits the options available to the user.

In view of the above, it is apparent that there exists a need for a method and system for generating a diverse search results.

SUMMARY

To address this limitation online shopping engines may incorporate the ability to return a diverse set of answers which best reflects the inventory of available listings. One method of addressing this problem is by generating multiple queries based on a user query and combining the results to show a representative set of answers. For example, a user query that looks for HONDA CIVICs is reformulated into two or more queries which return such cars with a proportional distribution of colors and years in order to reflect best the inventory of HONDA CIVICs. However, generating multiple queries to achieve diversity is ad-hoc and often expensive. A formal and more robust system to generate a diverse set of entries is needed. Further, the system may combine diversity with ranked answers using query keywords. The system should gracefully incorporate query relaxation in order to guarantee non-empty results to user queries.

In satisfying the above needs, as well as overcoming the enumerated drawbacks and other limitations of the related art, the disclosed embodiments relate to a system for generating a list with diverse results.

The system includes a query engine and an advertisement engine. The query engine is configured to receive a query from the user. The advertisement engine generates advertisement results corresponding to the query. The advertisement results are selected from entries in an advertisement database, where the entries include predicate values corresponding to a domain. The advertisement engine generates a diverse advertisement result that is a subset of the database entries that match the query. The diverse advertisement result varies at least one predicate by selecting entries for the list that include a proportional representation of each available predicate value in the database that matches the query.

The advertisement engine may also identify an order of the predicates in the domain for generating diversity. As such, higher order predicates will vary at least as much as the lower order predicates. The predicates may be indexed based on the order, for example using a Dewy identifier.

Each entry of the advertisement results may include a query score and the advertisement engine may rank the advertisement results by the query score and add entries from the database to the list where the score is above a minimum score. Then the advertisement engine can generate a diversity results based on the entries below the minimum score and add the diversity result to the list.

User specified queries may be provided through a form interface that allows a mix of structure and content-based selection conditions to be expressed over an underlying relation. Intuitively, the goal of diverse query answering is to return a proportionally representative set of top-k answers. The notion of diversity is based on a diversity ordering over the attributes of the base relation. Algorithms implemented by the system rely on pre-computed indices, for example a Dewey index, that captures the diversity ordering over attributes. A one-pass algorithm may be utilized that guarantees an optimal solution in one scan over the inverted lists. Alternatively, a probing algorithm may be used by allowing a bounded number of probes into the inverted lists. The algorithms may also combine keyword ranking with diversity.

Further objects, features and advantages of this invention will become readily apparent to persons skilled in the art after a review of the following description, with reference to the drawings and claims that are appended to and form a part of this specification.

DETAILED DESCRIPTION

Figure 1:
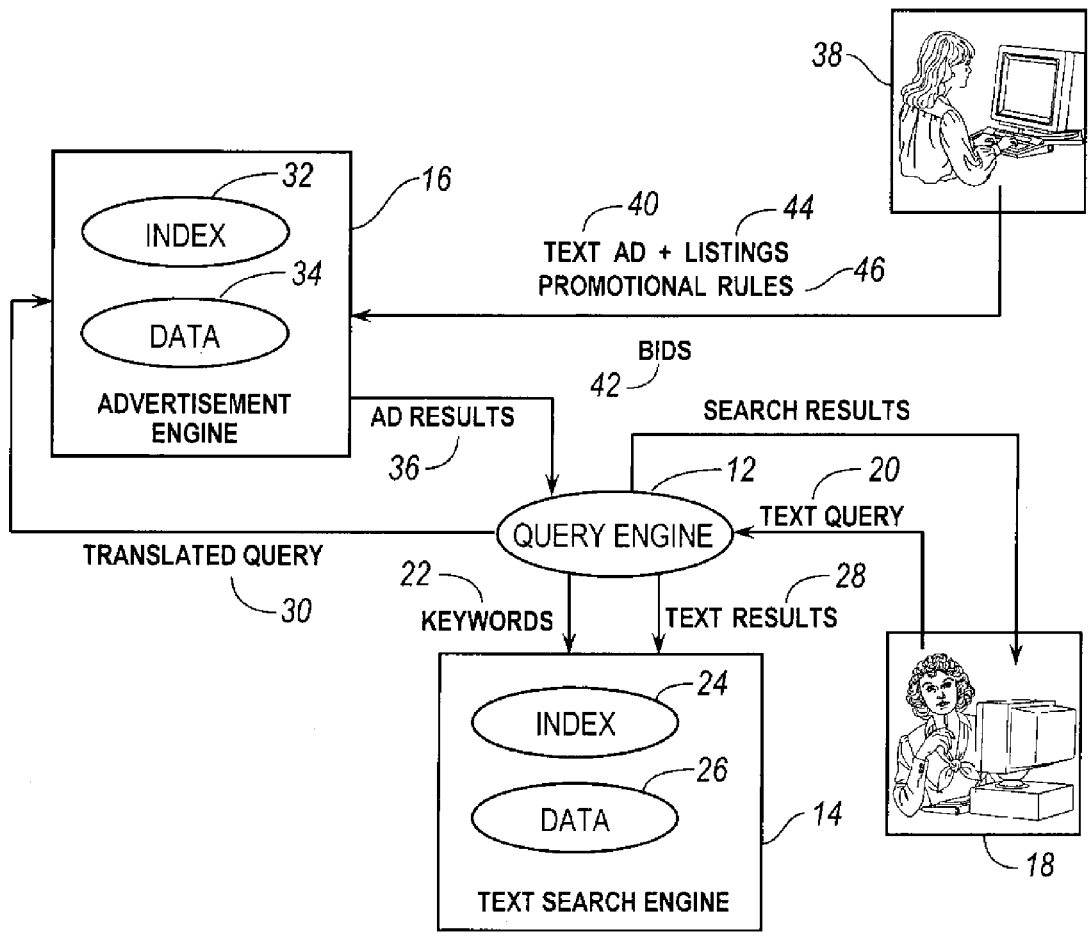
FIG. 1 is a schematic view of an exemplary system for generating a list of advertisements based on query intent.
Figure 2:
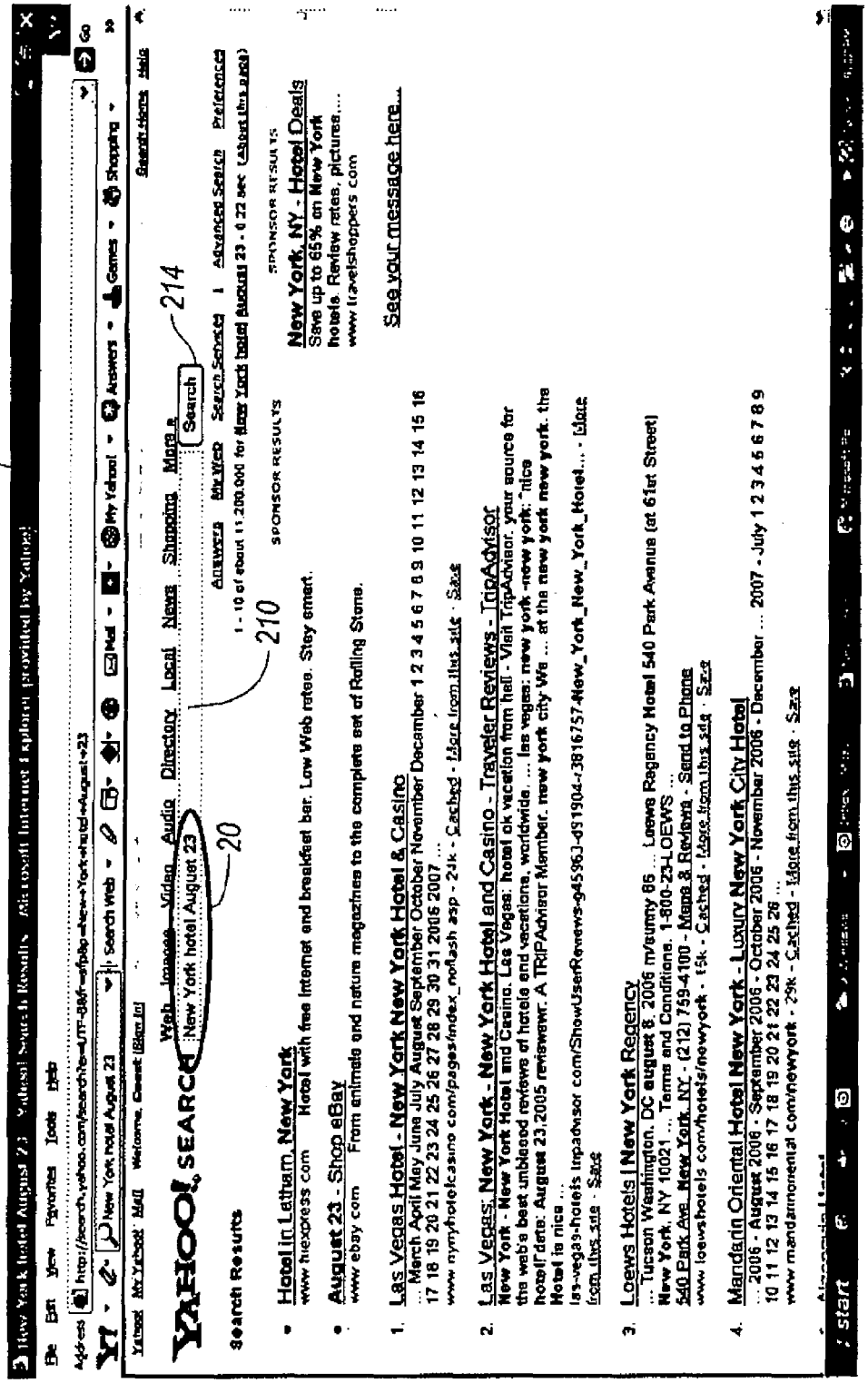
FIG. 2 is an image of a web page for entering a query.

Referring now to FIG. 1, an exemplary system embodying the principles of the present invention is illustrated therein and designated at 10. The system 10 includes a query engine 12, a text search engine 14, and an advertisement engine 16. The query engine 12 is in communication with a user system 18 over a network connection, such as an Internet connection. The query engine 12 is configured to receive a text query 20 to initiate a web page search. The text query 20 may be a simple text string including one or more keywords that identify or otherwise relate to the subject matter for which the user wishes to search. For example, the text query 20 may be entered into a text box 210 located at the top of the web page 212, as shown in FIG. 2. In the example shown, five keywords "New York hotel August 23" have been entered into the text box 210 and together form the text query 20. In addition, a search button 214 may be provided. Upon selection of the search button 214, the text query 20 may be sent from the user system 18 to the query engine 12. The text query 20 also referred to as a raw user query, may be simply a list of terms known as keywords. Referring again to FIG. 1, the query engine 12 provides the text query 20, to the text search engine 14 as denoted by line 22. The text search engine 14 includes an index module 24 and a data module 26. The text search engine 14 compares the keywords 22 to information in the index module 24 to determine the correlation of each index entry relative to the keywords 22 provided from the query engine 12. The text search engine 14 then generates text search results by ordering the index entries into a list from the highest correlating entries to the lowest correlating entries. The text search engine 14 may then access data entries from the data module 26 that correspond to each index entry in the list. Accordingly, the text search engine 14 may generate text search results 28 by merging the corresponding data entries with a list of index entries. The text search results 28 are then provided to the query engine 12 to be formatted and displayed to the user.

The query engine 12 is also in communication with the advertisement engine 16 allowing the query engine 12 to tightly integrate advertisements with the user query and search results. To more effectively select appropriate advertisements that match the user's interest and query intent, the query engine 12 is configured to further analyze the text query 20 and generate a more sophisticated translated query 30. The query intent may be better categorized by defining a number of domains that model typical search scenarios. Typical scenarios may include looking for a hotel room, searching for a plane flight, shopping for a product, or similar scenarios.

One earlier example included the text query "New York hotel August 23". For this example, the query engine 12 may analyze the text query 20 to determine if any of the keywords in the text query 20 match one or more words that are associated with a particular domain. The words that are associated with a particular domain may be referred to as trigger words. Various algorithms may be used to identify the best domain match for a particular set of keywords. For example, certain trigger words may be weighted higher than other trigger words. In addition, if multiple trigger words for a particular domain are included in a text query additional weighting may be given to that domain.

Once a domain has been selected, the keywords may be analyzed to identify known predicates for a particular domain. Predicates are descriptive terms that further identify the product or service being sought by the user. Some predicates are general predicates that may apply to all domains, for example the quantity or price of the product or service. Other predicates are domain specific predicates and fall into specific predefined categories for a particular domain. Referring to the "New York hotel August 23" text query example, once the domain is identified as the hotel domain, certain categories may be predefined that further identify the hotel stay sought, including for example the city, date, cost, etc. Accordingly, one possible format for the translated query may be provided below:

---

A translated user query may be a 4-tuple (kw, domain, gen_pred, dom_pred)
    kw is a list of keywords (from the raw user query)
    domain is the user intent
    gen_pred and dom_pred are propositional logic formulas.
        gen_pred := ε | gen_pred (∧ gen_pred) * |
            duration throughout time-range |
            quantity = value:float |
            price-range IN [ value:float , value:float ]
        dom_pred := ε | dom_pred (∧ dom_pred) * |
            name:string = value:typedValue |
            name:string IN [ value:typedValue , value:typedValue ]
            name:string IN geographic-area

---

Figure 3:
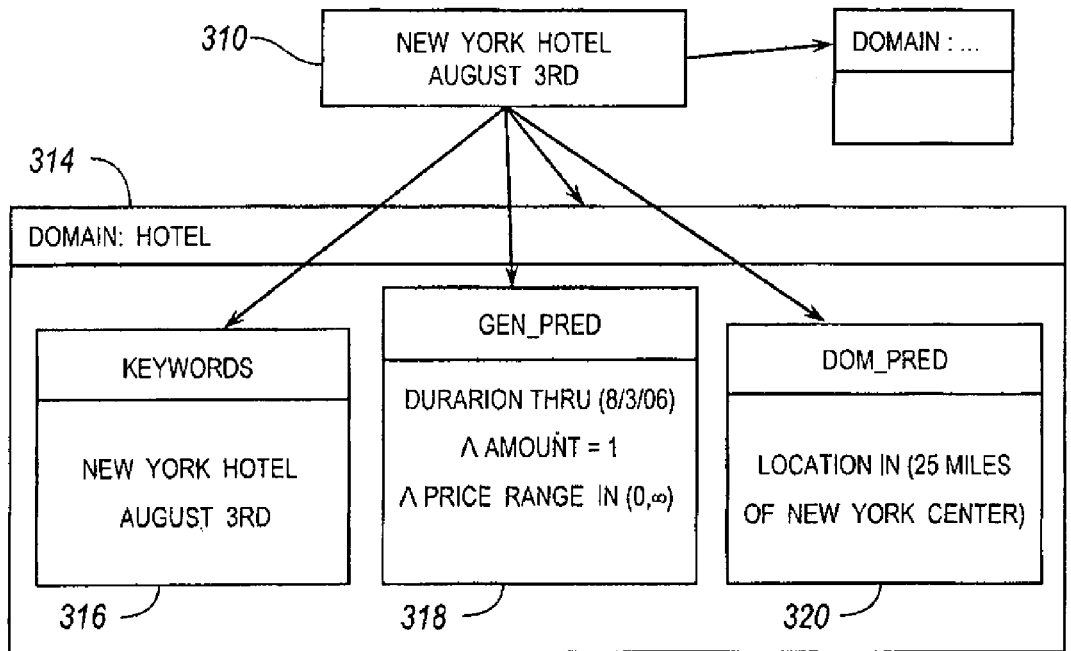
FIG. 3 is a graphical representation of a translated query.

This concept is further illustrated graphically in FIG. 3. Block 310 represents the text query New York Hotel August 3". The translated query is denoted by block 312. The domain is denoted by block 314 and is identified as the hotel domain. The keywords "New York", "Hotel", and "August 3" are also included in the translated query as noted by block 316. General predicates 318 may be identified from the text query or keywords including the date of stay "Aug. 3, 2006", the quantity (which may default to 1 for the hotel domain, could be identified by a phrase such as "2 rooms"), and the price range. Further, once the domain is identified as the hotel domain, domain specific predicates 320 can be further formatted for example the city and location (which may default to a value such as within 25 miles of the city center).

Figure 4:
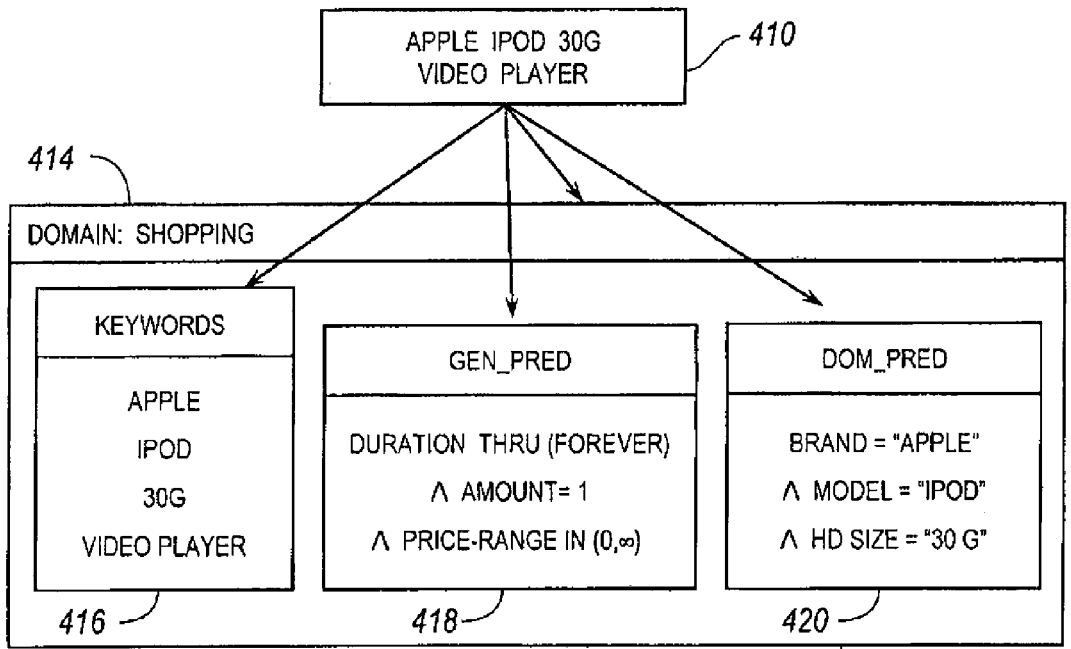
FIG. 4 is another graphical illustration of a translated query.

Another example, relating to shopping for a product, is provided graphically in FIG. 4. In this example, block 410 represents the text query "Apple iPod 30G video player". The translated query is generally denoted by block 412. The domain 414 is identified as the shopping domain. Also included in the translated query 414 are the keywords 416 including "Apple", "iPod", "30G", and "video player". In this example, the general predicates 418 may include the date offered, the quantity, and the price range, each of which may be derived from the keywords. Since the domain 414 is identified as the shopping domain, the domain specific predicates 420 can be selected based on the shopping domain. The domain specific predicates 420 for the shopping domain may differ significantly from the hotel domain, for example the brand and model of the product. In addition, other predicates may be further specified, for example, based on a hierarchy of domain predicates. Accordingly, once the model predicate is identified as "iPod", the hard drive size predicate can be identified and the keywords may be further analyzed to better specify the product sought.

Referring again to FIG. 1, the translated query 30 is provided to the advertisement engine 16. The advertisement engine 16 includes an index module 32 and a data module 34. The advertisement engine 16 performs an ad matching algorithm to identify advertisements that match the user's interest and the query intent. The advertisement engine 16 may select a diverse set of entries from the index module that match the query result. Accordingly, the advertisement engine 16 selects a set of entries that have a proportional representation of predicate values relative to the set of entries that match the query.

Alternatively, the advertisement engine 16 may compare the translated query 30 to information in the index module 32 to determine the correlation of each index entry relative to the translated query 30 provided from the query engine 12. The scoring of the index entries may be based on an ad matching algorithm that may consider the domain, keywords, and predicates of the translated query, as well as the bids and listings of the advertisement. The bids are requests from an advertiser to place an advertisement. These requests may typically be related domains, keywords, or a combination of domains and keywords. Each bid may have an associated bid price for each selected domain, keyword, or combination relating to the price the advertiser will pay to have the advertisement displayed. Listings provide additional specific information about the products or services being offered by the advertiser. The listing information may be compared with the predicate information in the translated query to match the advertisement with the query. An advertiser system 38 allows advertisers to edit ad text 40, bids 42, listings 44, and rules 46. The ad text 40 may include fields that incorporate, domain, general predicate, domain specific predicate, bid, listing or promotional rule information into the ad text.

The advertisement engine 16 may then access data entries from the data module 34 that correspond to each index entry in the list from the index module 32. Accordingly, the advertisement engine 16 may generate advertisement results 36 by merging the corresponding data entries with a list of index entries. The advertisement results 36 are then provided to the query engine 12. The advertisement results 36 may be incorporated with the search results 28 and provided to the user system 18 for display to the user.

For the advertisement engine 16 to introduce diversity into the advertisement results 36, it may rely on certain predefined factors. Diversity depends both on domain knowledge of what is considered representative of an inventory and on the user search query. Consider the example given in Table 1 and the query $Q_1$: Make='HONDA' and Year='2005' given in Table 2.

TABLE 1

| Id | Make | Model Year | Year | Color | Description |
|----|------|------------|------|-------|-------------|
| 1 | Honda | Civic | 2005 | Green | Good condition |
| 2 | Honda | Civic | 2005 | Blue | Great mileage |
| 3 | Honda | Civic | 2007 | Green | Powerful |
| 4 | Honda | Accord | 2005 | Red | Low Mileage |
| 5 | Honda | Accord | 2006 | Green | Best price |
| 6 | Honda | Odyssey | 2005 | Green | Low mileage |
| 7 | Toyota | Pruis | 2007 | White | Environment Friendly |
| 8 | Toyota | Prius | 2006 | Black | Compact |
| 9 | Toyota | Corolla | 2005 | Black | Priced to sell |
| 10 | Toyota | Corolla | 2007 | Blue | Limited collection |
| 11 | Toyota | Camry | 2005 | Blue | Limited collection |

TABLE 2

$Q_1$: Make = 'Honda' and Year = '2005

| 1 | Honda | Civic | 2005 | Green | Good condition |
|---|-------|-------|------|-------|----------------|
| 2 | Honda | Civic | 2005 | Blue | Great mileage |
| 4 | Honda | Accord | 2005 | Red | Low Mileage |
| 6 | Honda | Odyssey | 2005 | Green | Low mileage |

There are a total of 4 cars in the database that satisfy the query $Q_1$. Assume that the number of query results is limited to 3. Given the two sets of answers $R_{11}$ and $R_{12}$, in Tables 3 and 4, intuitively, $R_{12}$ is more representative of the set of answers to $Q_1$ than $R_{11}$.

TABLE 3

$R_{11}$

| 1 | Honda | Civic | 2005 | Green | Good condition |
|---|-------|-------|------|-------|----------------|
| 2 | Honda | Civic | 2005 | Blue | Great mileage |
| 4 | Honda | Accord | 2005 | Red | Low Mileage |

TABLE 4

$R_{12}$

| 1 | Honda | Civic | 2005 | Green | Good condition |
|---|-------|-------|------|-------|----------------|
| 4 | Honda | Accord | 2005 | Red | Low Mileage |
| 6 | Honda | Odyssey | 2005 | Green | Low mileage |

In other words, varying car models (one CIVIC, one ACCORD and one ODYSSEY) within the make specified in the query (HONDA), is more representative of the available inventory of cars than varying the car color within the same model. In fact, $R_{11}$ does not constitute a diverse result set for query $Q_1$ because it contains similar entries while $R_{12}$ contains entries with distinct values. Based on this simple observation, the notion of diversity may be defined. The system relies on providing a diversity ordering of the attributes that belong to an application domain (in this case, attributes are make, model, year, and color) and defining query answers to be diverse if the values of a higher priority attributes are seen in those answers before varying the values of lower priority attributes. Diversity ordering is the prior domain knowledge needed to define diversity for queries within that domain. For the example shown in Table 1, a car model is ranked higher than a car color. Therefore, varying car models in a set of query answers has higher priority than varying car colors.

Given the Cars relation in Table 1, let us assume that we are evaluating another query $Q_2$ that requests all 2005 cars: Year=2005. Suppose now that the number of cars to return is limited to 4. Tables 5 and 6 show two sets $R_{21}$ and $R_{22}$.

TABLE 5

$R_{21}$

| 1 | Honda | Civic | 2005 | Green | Good condition |
|---|-------|-------|------|-------|----------------|
| 2 | Honda | Civic | 2005 | Blue | Great mileage |
| 4 | Honda | Accord | 2005 | Red | Low Mileage |
| 11 | Toyota | Camry | 2005 | Blue | Limited collection |

TABLE 6

$R_{22}$

| 2 | Honda | Civic | 2005 | Blue | Great mileage |
|---|-------|-------|------|-------|----------------|
| 4 | Honda | Accord | 2005 | Red | Low Mileage |
| 9 | Toyota | Corolla | 2005 | Black | Priced to sell |
| 11 | Toyota | Camry | 2005 | Blue | Limited collection |

Both sets are valid query results. However, the representation of HONDAs in $R_{21}$ is higher than that of TOYOTAs while $R_{22}$ has a proportional representation of both car makes. Informally, diversity must ensure a proportional representation of the inventory of cars in the database. Obviously, if in addition to cars 1, 2 and 4, the only other 2005 car was 11, then $R_{21}$ would have been diverse with respect to the database; hence the definition of diversity should consider the available set of answers.

In addition, relaxation may be combined with diversity to provide a guaranteed number of entries in the search results. Relaxation may generally include adding entries to the search results that do not match all of the search criteria. This may be done by generating a new query eliminating some of the less important query criteria. Similarly, query relaxation may be used in online shopping in order to guarantee a non-empty result. For example, query $Q_3$: Make='HONDA' and Model='ACCORD' has only 2 results. If the user expects 5 results, query relaxation would be needed to return 3 extra results. Possible candidates in this case are other HONDA models or even other car makes. The choice of which predicate to relax in the query can be guided by the need to maximize the number of query predicates that are matched exactly (in which case, varying the model and returning CIVICs and ODYSSEYS is preferable) or by wanting to enforce query diversity (in which case, varying the make is preferable). As another example, consider query $Q'_3$: Make=TOYOTA' and Year=2005 and Color='Green'. Since Make is the most important attribute, it may be desirable to return as many TOYOTAs as possible, relaxing both the year and the color requirements, if necessary. On the other hand, there may be environments where it is more important to match as many predicates as possible, even if it means not matching the highest-ranked predicate. The system enables any combination of these cases by associating a weight to each query predicate as discussed later.

Query relaxation naturally applies to keyword conditions. For example, query $Q_1$ can be augmented with the additional condition description C "Low mileage" and "Good condition". Clearly, if the augmented query above is interpreted exactly, none of the answers in Table 2 would be returned. In particular, car 1 would not be returned even if only one of "Low mileage" or "Good condition" is enforced. In the same manner as for scalar predicates, query relaxation is enabled on keyword conditions by treating each keyword condition as a weighted predicate. Weights can be computed using methods such as tf*idf to measure the relevance of each answer to each keyword predicate. Therefore, the system seamlessly integrates diversity, keyword ranking, and query relaxation on both scalar and keyword predicates.

The system also provides efficient query evaluation algorithms to find a diverse set of query answers of size k. As such, an indexing mechanism utilizing Dewey identifiers may be used. Given a diversity ordering of attributes in an application domain and a query over a subset of those attributes, the index captures the notion of distinct values from which representative subset is needed in the final query result. First an algorithm is provided that produces k diverse answers with a single scan (one-pass) over the inverted lists. The key idea of the algorithm is to explore a bounded number of answers within the same distinct value and use B+-trees to skip over similar answers which will not contribute to the diversity of the final query result. The one-pass algorithm is conservative and guarantees that at any point during the execution of the algorithm, the set of results form a diverse set, given the data seen up to that point. Although the one-pass algorithm is optimal when only a single pass over the data is allowed, improvements may be made if a small number of probes are made into the data. An improved algorithm is also provided that probes the set of answers within the same distinct value iteratively. The probe algorithm picks one answer at a time from each distinct value and iterates until k diverse results are found. It uses just a small number of probes, at most 2k.

The one-pass and probing algorithms are also extended to the case where answers are scored. The scored diversity algorithms gracefully combine skipping over answers that will not contribute to the diversity of the final result and pruning answers that will not make it to the k best diverse answers. This is achieved by combining a search algorithm, such as a WAND algorithm, with the diversity algorithms.

The items for sale may be stored as tuples in a relation R. An example is the Cars relation given in Table 1. Similarly, there can be many other relations corresponding to different application domains such as laptops, furniture, clothing, etc. Without loss of generality, the Cars relation will be used as an example throughout the rest of the specification.

A query Q on a relation R, may be defined as a conjunction of two kinds of predicates: scalar predicates of the form att=value and keyword predicates of the form att C keywords where att is an attribute of R and C stands for keyword containment. A tuple t satisfies a query Q if it satisfies at least one predicate in the query. This loose interpretation of the query is quite common in online applications where items may be returned even if they do not satisfy all query predicates. Relaxation may be applied to both kinds of query predicates. Given a query Q over a relation R, Ext(Q,R) may be defined as the set of all tuples in relation R which satisfy Q.

Given a query Q and a tuple t ∈ Ext(Q,R), score(t,Q) denotes the score of t with respect to Q. Accordingly, for a general definition of diversity, score(t,Q) may be an arbitrary function. In order to define diversity, a diversity ordering is provided among attributes of the base relation. Informally, a diversity ordering over the attributes of a relation R, defines a preference relationship between its attributes that determines which values need to be varied in order to guarantee as much representation as possible of entries within a list of size k. The preference relationship defines a total order among the attributes of a relation. For example, given the Cars relation in Table 1, its diversity ordering is defined by: Make◁Model◁Color◁Year◁Description. Based on this ordering, varying the value of Make from one tuple to the next in the same set has higher priority than varying the value of Model, which itself has higher priority than varying the Color and so on. The attributes forming the key of a relation are not specified in the diversity ordering since they vary automatically from one item to the next (i.e., they have the lowest priority). Diversity ordering is application dependent and needs to be provided at database creation time.

Each tuple is uniquely identified by the concatenation of the values of its attributes. By making sure that those values are concatenated in the diversity ordering, each tuple reflects the diversity ordering. For example, the tuple with Id value 2 in the Cars relation in Table 1 is uniquely represented by the value HONDA.CIVIC.2005.Blue.Great Mileage.

Figure 5:
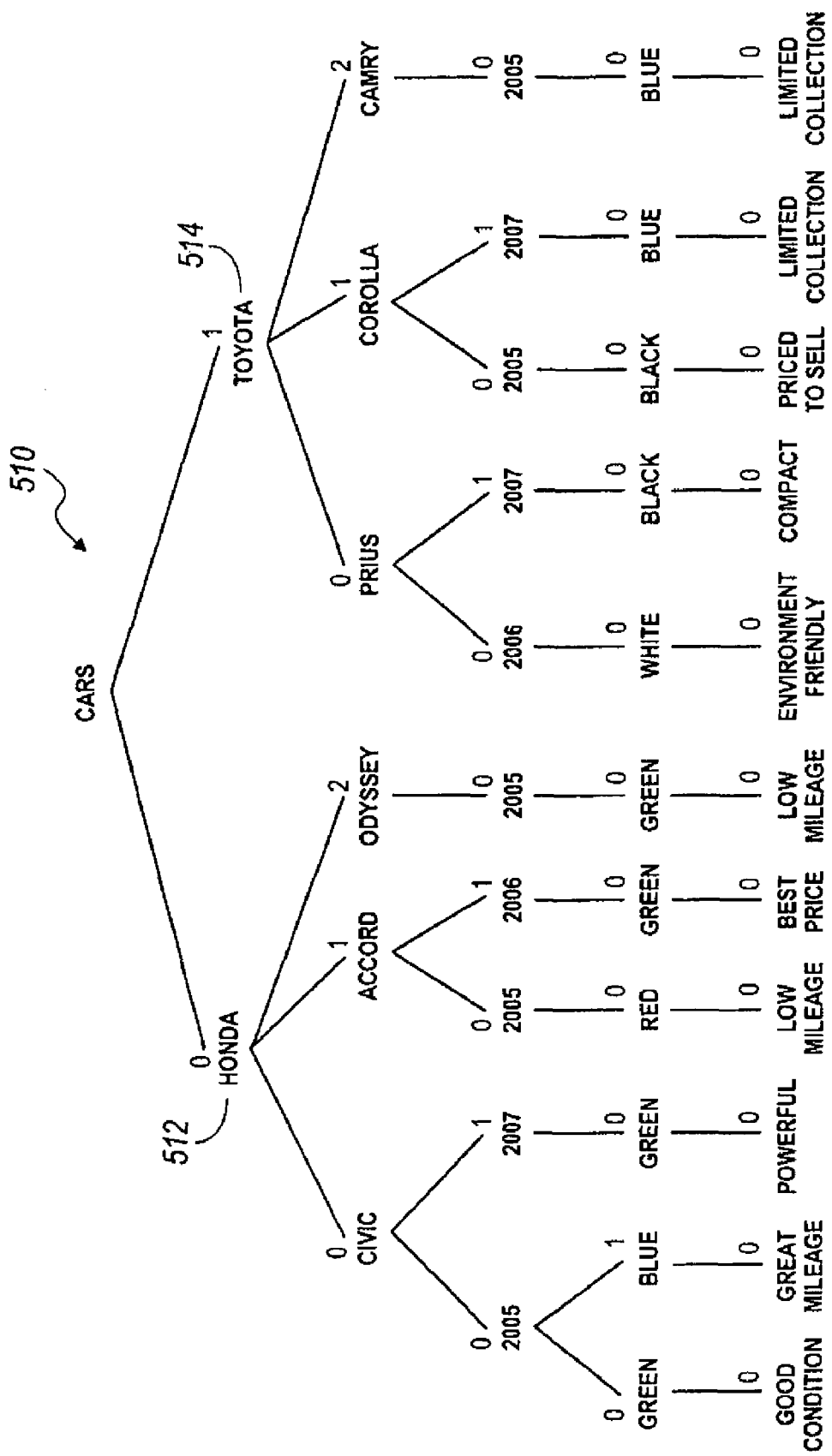
FIG. 5 is an exemplary tree diagram for a cars relation.

By assigning a distinct integer identifier to each value in an attribute, the representation becomes more compact. Table 7 shows how this is done for the Cars relation. This value assignment is a type of Dewey encoding and can be represented in a tree 510, as illustrated in FIG. 5. However, the encoding is quite compact since the system only needs to distinguish between siblings and thus numbering can start over from 0 at each level. Nonetheless the representation of values in this way can be referred to as Dewey IDs, or simply Deweys. Each leaf value is obtained by traversing from the tree top down and assigning a distinct integer to siblings.

TABLE 7

| Id | Index |
|---|---|
| 1 | 0.0.0.0.0 |
| 2 | 0.0.0.1.0 |
| 3 | 0.0.1.0.0 |
| 4 | 0.1.0.0.0 |
| 5 | 0.1.1.0.0 |
| 6 | 0.2.0.0.0 |
| 7 | 1.0.0.0.0 |
| 8 | 1.0.1.0.0 |
| 9 | 1.1.0.0.0 |
| 10 | 1.1.1.0.0 |
| 11 | 1.2.1.0.0 |

The longest common prefix (lcp) of two tuples represents the length of the longest chain of attribute values shared by the Deweys of the two tuples in diversity order. As such, the longest common prefix given two tuples $t_1$, $t_2 \in R$, $lcp(t_1, t_2)$ denotes the length of the longest common prefix of the Dewey representations of $t_1$ and $t_2$. For example, lcp(1.1.0.0.0, 1.1.1.0.0) is 2. The lcp of two tuples is equal to 0 when they do not share a common prefix. Given a set of tuples T, a tuple t, and an integer n, $L(T, t, n) = \{t' \in T : lcp(t, t') \geq n\}$ denotes the set of tuples in T that share a prefix of length at least n with t. With this in mind diversity may be defined as described below:

For a query Q over a relation R, $R_{div}$ is a diverse result for Q iff:

$$R_{div} \subseteq R \qquad 1$$

$$\forall t_1 \neq t_2 \in R_{div} \forall t_3 \in Ext(Q, R) \forall n \in Nlcp(t_1 t_2) = \qquad 2$$
$$n \wedge lcp(t_1, t_3)(n \Rightarrow \exists t_4 \in R_{div}(lcp(t_3, t_4))lcp(t_1, t_3)).$$

$$\forall t_1 \neq t_2 \in R_{div} \forall t_3 \in Ext(Q, R) \forall n \in Nlcp(t_1 t_2) = \qquad 3$$
$$n \wedge lcp(t_1, t_3)(n \Rightarrow \exists t_4 \in R_{div}(lcp(t_3, t_4))lcp(t_1, t_3)).$$

The first condition requires the diversity results $R_{div}$ and a subset of the search results R. The second condition above simply states that to be considered diverse, a set $R_{div}$ must contain tuples that vary the attributes with high diversity order before including tuples that vary the attributes with low diversity order. For example, to be considered diverse with respect to query $Q_1$ in Table 1, a set of tuples, of size greater than or equal to 4, would need to contain tuples 1, 4, and 6 in order to allow tuple 2 to be in the result since Model has a higher diversity order than Color. The third condition enforces proportional representation for different distinct values by stating that if the number of tuples between two distinct values varies, it is because all available tuples for one value have been picked. This is because it is not always possible to have the same number of items across all distinct values. In some cases, there is only a small number of items for a given distinct value. By definition, Ext(Q,R) is diverse.

In the case that tuples are scored, tuples with the highest scores are returned first. However, for many applications, there will be many tuples tied for the last spots. In this case, we may be able to give a more diverse set of answers by choosing from among the tuples with that lowest score. This concept may be referred to as scored diversity.

Given a set of tuples $T \subseteq Ext(Q,R)$, a tuple t, an integer n, and a score s, $LS(T, t, n, \overline{s}) = \{t \in L(T, t, n): score(t,Q) \geq s\}$ is defined to be the set of tuples in T whose score with respect to a query Q is at least that of t.

Given a set of tuples $T \subseteq Ext(Q,R)$, $minscore(T) = min(\{score(t,Q): t \in T\})$.

As such, given a query Q over a relation R, $R_{div}$ is a diverse result for Q iff:

$$R_{div} \subseteq Ext(Q,R) \qquad 1$$

$$\forall t_1 \in R_{div} \forall t_3 \in Ext(Q, R), (score(t_2, Q))score(t_1, Q) \Rightarrow t_2 \in R_{div}. \qquad 2$$

$$\forall t_1, t_2 \in \qquad 3$$
$$R_{div} \forall t_2 \in Ext(Q, R) \forall n \in N(score(t_{1\_} = min\ score(R_{div}) \wedge lcp(t_1, t_2) =$$
$$n \wedge score(t_3) \geq min\ score(R_{div} \wedge lcp(t_1, t_3)(n) \Rightarrow$$
$$\exists t_4 \in R_{div}(lcp(t_3, t_4))lcp(t_1, t_3)).$$

$$\forall t_1, t_2 \in R_{div} \forall n \in N(lcp(t_1, t_2) = n \wedge size(L(R_{div}, t_1, n+1)) \qquad 4$$
$$\langle size(L(R_{div}, t_2, n+1)) - 1 \Rightarrow L(R_{div}, t_1, n+1) =$$
$$LS(Ext(Q, R), t_1, n+1, min\ score(R_{div})) \vee$$
$$L(R_{div}, t_2, n+1) =$$
$$LS(Ext(Q, R)t_2, n+1, min\ score(R_{div}) + \in).$$

These rules reduce to the diversity definition given above for unscored diversity when the scores of all tuples are the same. The second condition requires that higher scored items must be present in the result if a lower scored item is present in the result, guaranteeing that more relevant answers are picked first. The third condition enforces diversity among the lowest scored tuples. It does that by requiring that tuples with at least the minimum score and which vary attribute values with higher diversity order are picked before other tuples are considered. The final condition guarantees proportional representation by requiring that if there is no proportional representation at a given distinct value, then that is because either the smaller set has used up all tuples whose score is >=the minimum score, or the larger set only has items with scores>the minimum score.

Although unscored diversity may be appropriate in a variety of applications, it is often useful to allow tuples to have scores. In addition to more straightforward applications, it can be of use in query relaxation. The notion of scored diversity allows diverse query relaxation to be captured gracefully. But first, a straightforward use of assigning scores can be considered, score(t,Q). Commonly, the score of t is computed as a combination of the scores obtained from the keyword predicates satisfied by t. Since the TF (Term Frequency) of terms for each tuple is usually equal to 1, the IDFs (Inverse Document Frequency) of each term can be combined to compute the score of a tuple. Typically, given a keyword w (which could also be a phrase), its IDF defines the ratio of the number of tuples in R to the number of tuples containing w. IDF is computed as follows:

$$IDF(k) = \frac{|R|}{|\{t: t \in R \wedge contains(t, w)\}|}$$

where contains (t, w) returns true if t's description attribute contains w. The score of a tuple t is defined as $$score(t, Q) = \sum_{w \in \wedge contains(t,w)} IDF(w)$$

If t does not satisfy any keyword predicate in Q, score(t,Q)=0. Although one could assign scores to scalar predicates, for simplicity, it may be assumed here that scores are computed using keyword predicates only. Now, consider using scores for query relaxation. Suppose a query searching for Green 2007 HONDAs is provided. It is frequently the case that the database does not have k tuples satisfying the queries. In this case, the requirements will be relaxed. Several reasonable ways of doing this may be used depending on what behavior is desired. In each case, a weight is assigned to each attribute value. For value v, the weighting is denoted as w(v, Q). (Note that these weights can be decided at query time.) Then the score for tuple t is defined as $$\text{score}(t, Q) = \sum_{v \in \wedge \text{contains}(t,v)} w(v, Q)$$

where $v \in Q$ if Q contains a predicate of the form att=v or att C v, and contains (t, v) if t has an attribute matching v. Varying these weights provides a great deal of flexibility in the scoring method. The simplest scoring method is just to give each attribute the same weight. So tuples that match exactly two predicates of the query have exactly the same score. Hence, a Green 2007 TOYOTA CAMRY is equally as good as a Blue 2007 HONDA CIVIC. (Since the system diversifies across the Make field, it is likely that the system would return a variety of Green 2007 cars.)

A more sophisticated variant of this is to assign a weight of 1+diversityOrder×C to each value, where diversityOrder is higher for higher priority attributes and C is a small positive value. In this case, the Make value (Honda) will have weight 1.0004, the Year value (2007) will have weight 1.0002, and the Color value (Green) will have weight 1.0001. Again, tuples that satisfy more predicates have higher scores. However, preference is given to tuples that match predicates associated with attributes that are higher ranked in the diversity order. So, for example, a Blue 2007 HONDA CIVIC has a higher score than a Green 2007 TOYOTA CAMRY, even though both match exactly two predicates. This produces improved results, since it satisfies as many predicates as possible, breaking ties based on the diversity order.

Another weighting defines the weight of each attribute as $2^i$, where fields higher in the diversity order get a larger i. In the example described, a Honda gets score 8, a 2007 gets score 2 and Green gets score 1. In this case, HONDAs are favored over non-HONDAs, and 2007 HONDAs are favored over cars that are not. Of course, the desired behavior can be application specific.

It is easy to see that other weightings could be devised to control answer ranking depending on the desired behavior. Moreover, the disclosed weighting system also allows some attribute values to be treated as 'similar.' For example, some weight may be given to TOYOTA when answering queries about HONDAs. It will be appreciated that it is simple to combine relaxation scores with real scores derived in some other manner.

The key here is that regardless of the weighting method used, diversity and the algorithms for finding diverse sets of answers handle it gracefully and with no major changes to the system.

Therefore, given a user query Q over a relation R and k is the desired number of results, Ext(Q,R) is the set of all tuples in D that satisfy Q, the system is configured to efficiently compute a set $R_{div}$ for Q of size k size(Ext(Q,R)) such that $R_{div}$ is scored diverse with respect to Q.

One standard approach for efficient query processing is to maintain inverted indices for each attribute value. When a query is called, its result set is simply the set of items lying in the intersection of the lists corresponding to the attribute values appearing in the query. When only the top k results are requested, this intersection can be found extremely efficiently.

Throughout all of the algorithm listings provided, a mergedList is identified. Conceptually, the mergedList is a list corresponding to the intersection of the lists associated with a given query. In reality, it would be a simple matter to actually construct such a list, by iterating over all of the lists associated with the query. In practice, however, this is time consuming and unnecessary. Instead, calls to mergedList.next(id) are facilitated. This call simply returns the smallest Dewey ID that is greater than or equal to id, and that also appears in the merged list. Hence, it is a simple matter to find a top-k (non-diverse) list. Simply k calls are made to merged List.next(•).

In the algorithms based on probing, forward and backward moves are used through the merged list. Backward moves are obtained by calling mergedList.next(id, RIGHT). It returns the largest Dewey ID that is less than or equal to id, and that appears in the merged list. Calls to mergedList.next(id, LEFT) behave as in the ordinary next. The results are also extended to handle scored items. For a given θ, calls to mergedList.next(id, LEFT, θ) return the smallest Dewey ID greater than or equal to id that has score at least θ (and that also appears in the merged list). Calls using RIGHT are defined similarly.

The implementation of next(•) may use the same techniques as the WAND algorithm. WAND is an extremely efficient method for obtaining top-k lists of scored results (much of this efficiency lies in its implementation of next). Note that it does not return a diverse set of answers. However, WAND may be used as a starting point for the scored diversity algorithm, although, any top-k algorithm would suffice.

As previously mentioned, it is helpful to think of the results as existing in a Dewey Tree 510, as shown in FIG. 5. Tuples correspond to leaves in the tree. Diverse answers correspond roughly to nodes in different branches. (e.g. HONDAs 512 and TOYOTAs 514 split to different branches from the root node, while a HONDA CIVIC 2005 Green car and a HONDA CIVIC 2005 Blue car do not diverge until much later.)

The algorithm simulates iterating through branches of the Dewey tree 510. As such, key operators are used, nextId and extremeId. Each operator is described in the following example. Let id=1.2.3.4.5. First, nextId(id, level, LEFT) increments id at the entry corresponding to level. So, for instance, nextId(id, 2, LEFT) returns 1.3.3.4.5, while nextId (id, 5, LEFT) returns 1.2.3.4.6. Notice that the system does not actually look at a Dewey tree. It simply increments the proper entry. The calls using RIGHT work in an analogous way, decrementing the proper entry. Calls to extremeId(id, level, LEFT) simply return the smallest ID agreeing with id for the first level-1 entries. For example, extremeId(id, 3, LEFT) returns 1.2.0.0.0. Calls using RIGHT work analogously. Suppose that no Dewey ID uses an entry greater than 68. Then extremeId(id, 3, RIGHT) could return 1.2.68.68.68.

A naive approach to ensure query diversity would be to compute all query answers and then pick a diverse subset. This approach requires the system to evaluate the full set of answers even when the number of desired results is orders of magnitude smaller, which is usually the case in practice. Therefore, another approach uses query rewriting. This approach uses the distribution of values of the attributes of the base relation. For example, given query $Q_1$, which looks for 2005 HONDAs, it is rewritten into 3 queries: one which looks for HONDA CIVICs 2005, another one for HONDA ACCORDs 2005 and another one for HONDA ODDYSSEYs 2005. This requires the knowledge of existing HONDA models in the database. Depending on how much information is known (e.g., "there exists at least one occurrence of HONDA ACCORD in the inventory" or "There are 2 HONDA ACCORDs in the inventory"), the set of generated queries may differ. If only coarse information is known, one could use these techniques to decide the order in which queries are evaluated.

The system may also utilize one-pass algorithms that take a single pass over the data. The one-pass algorithm is able to skip over a potentially great number of items, resulting in substantial savings. However, it is much less efficient than techniques that are able to make several random accesses into the data.

Figure 6:
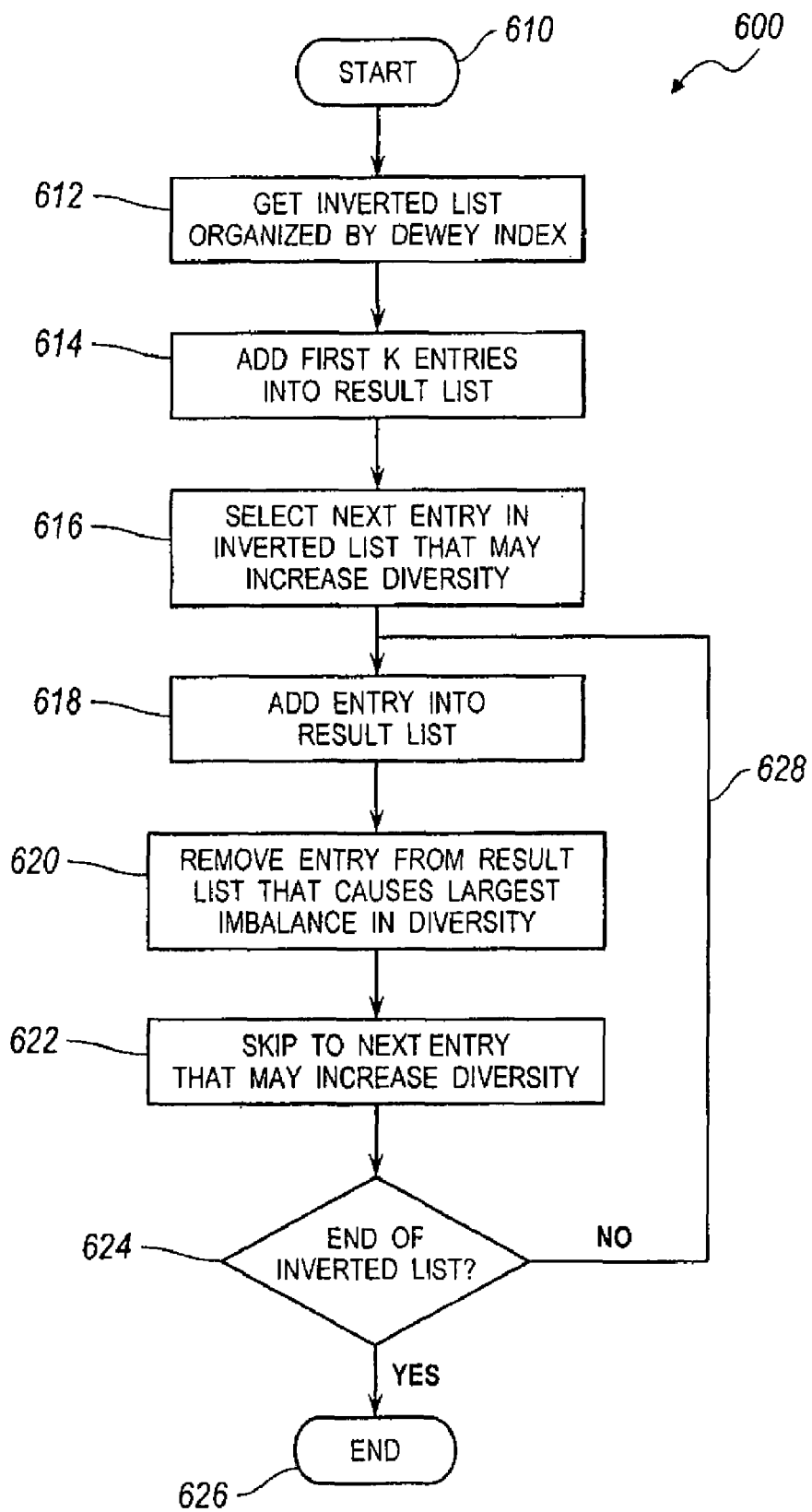
FIG. 6 is a flowchart of an exemplary method for implementing a one-pass algorithm.

One method 600 of implementing a one-pass algorithm is provided in FIG. 6. The method starts in block 610 and proceeds to block 612 where the advertisement engine 16 gets an inverted list organized by Dewey index. In block 614, the advertisement engine adds the first k entries into the result list where k represents the number of entries requested. In block 616, the advertisement engine 16 selects the next entry in the inverted list that may increase diversity. This may include skipping branches of the tree. For example, if six (6) entries were requested in the list and the list already included three (3) HONDA CIVICs and three (3) HONDA ACCORDs, adding additional ACCORDs would not increase model diversity if additional models are present. In block 618, the entry selected in block 616 is added to the result list. In block 620, the advertisement engine 16 removes the entry from the result list that causes the largest imbalance in diversity. The advertisement engine 16 again skips to the next entry that may increase diversity, as denoted by block 622. In block 624 the advertisement engine 16 determines if the end of the inverted list has been reached. If the end of the inverted list has been reached, the method 600 proceeds to block 626 where the method ends. If the end of the inverted list has not been reached, the method 600 follows line 628 to block 618, where the next entry is added into the list results and the method 600 proceeds as described above.

Pseudocode is given in Algorithm 1 for a one-pass unscored diversity algorithm. For ease of explanation, it will be assumed for now that line 10 always sets skipId to be id+1.

In the first stage (lines 4-6), the algorithm simply adds the first k results it finds to the list. In the next stage (ignoring line 10), it adds the next result it finds. The algorithm then calls remove( ) which removes the result causing the most imbalance in the diversity. It repeatedly does this until all results have been processed.

Algorithm 1 Driver for unscored one-pass algorithm

```
Driver Routine:
1:  Id= mergedList.next(0)
2:  root=new Node(id, 0)
3:  id = mergedList.next(id)
4:  while (root.numItems( ) < k && id ≠ NULL)
5:      root.add(id)
6:      id = mergedList.next(id+1)
7:  while (id≠NULL)
8:      root.add(id)
9:      root.remove( )
10:     skipId = root.getSkipId( )
11:     id = mergedList.next(skipId)
12: return root.returnResults( )
```

It is not hard to see that this algorithm will indeed give a diverse set of answers. However, this will also cause us to process every result in the mergedList (similar to the post-processing algorithm). The algorithm may also be enhanced such that certain IDs, if added, would be immediately removed during the call to remove( ). So getSkipId( ) simply finds the smallest ID that would not be removed on the subsequent call to remove( ). Hence, the algorithm may potentially save many calls to next.

To see how many calls are actually made, consider the following rough estimate: Suppose a node v has v.numItems≦r throughout its life. (Here, v.numItems refers to the number of results in the subtree rooted at v.) What is the largest numItems for each of its children? Its leftmost child could potentially have numItems as large as r. Its second child would have numItems at most r/2 (any more, and they would be removed immediately, hence skipped). The third child has at most r/3, and so on. This sums to r+r/2+ . . . r/r≈r ln r, and in general bounded above by r ln(3r). Applying this analysis recursively, the number of calls is bounded by k $\ln^d$(3k). When the mergedList has many results, this can be a significant difference.

The one-pass algorithm in the scored case is remarkably similar to the unscored case. The major difference lies is what parts of the tree the system can skip over. In the unscored case, it was easy to determine the smallest ID that would not be removed on the next call to remove( ). In the scored case, the system adds any item whose score is strictly greater than the current minScore (i.e. the smallest score in our result set). However, the system can find the smallest ID that would immediately be removed, given that its score is no greater than minScore. Hence, line 11 of the unscored one-pass algorithm is replaced with the line id=mergedList.next(id+1,skipId,root.minScore)

The semantics of the above line is to return the smallest id greater than or equal to id+1 such that either (1) score(id) >root.minScore, or (2) score(id)≧root.minScore, and the return id is greater than skipId.

With the above exception, the algorithm proceeds as before. Probing algorithms improve the complexity of the one-pass version.

Figure 8:
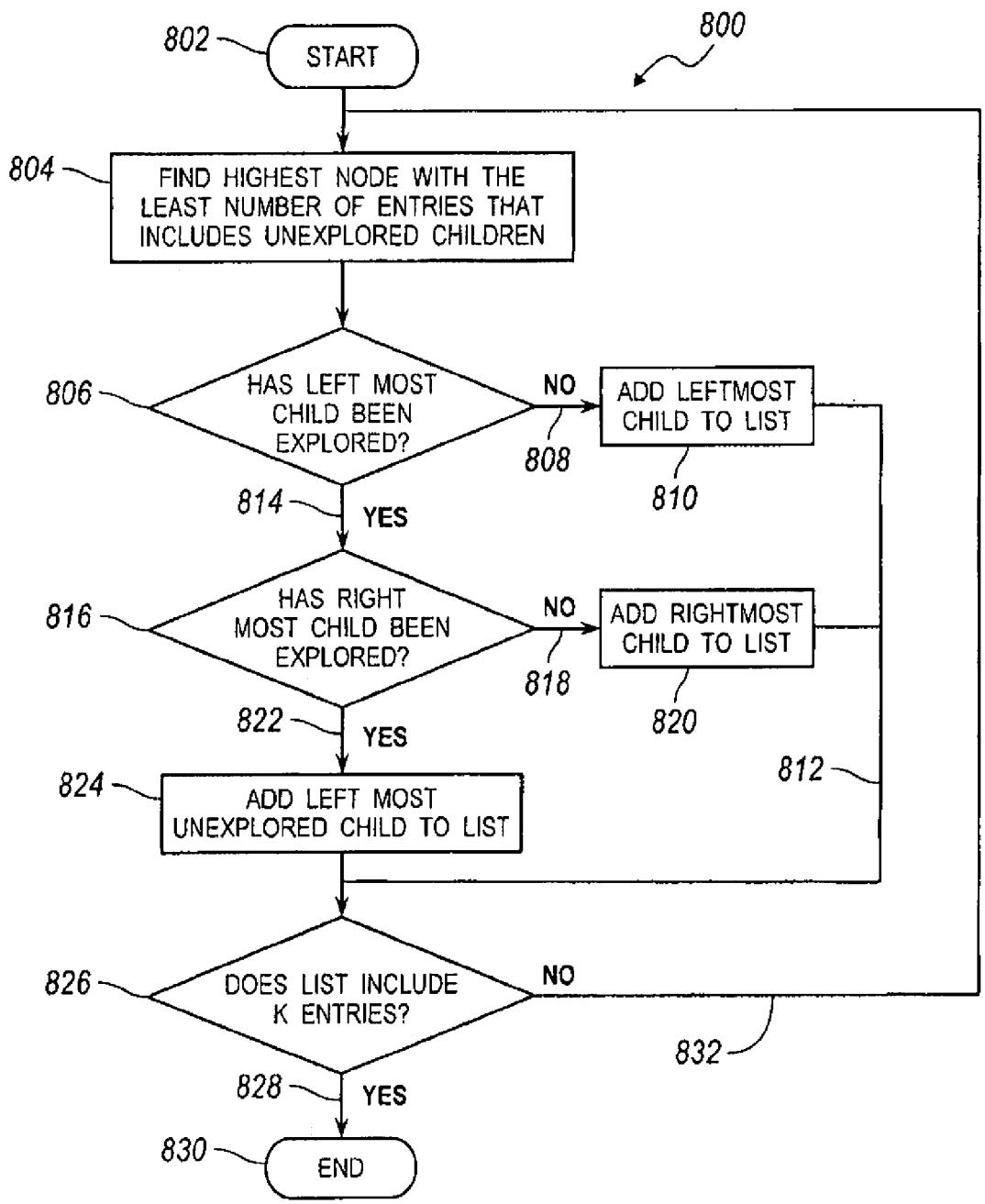
FIG. 8 is a flowchart of an exemplary method for implementing a probing algorithm.

A method 800 implementing a probing algorithm is provided in FIG. 8. The method starts in block 802 and proceeds to block 804, where the advertisement engine 16 finds the highest node with the least number of entries and that includes unexplored children. In many instances, multiple nodes at the same level will both have the least number of entries. As noted, nodes where each child branch has already been added to the list will be ignored, then the leftmost node may be used first. In block 806, the advertisement engine 16 determines if the leftmost child of the node has been explored. If the leftmost child of the node has not been explored, the method follows line 808 and the leftmost child is added to the list, as noted by block 810. The method then follows 812 to block 826. Referring again to block 806, if the leftmost child has been explored, the method 800 follows line 814 to block 816. In block 816, the advertisement engine determines if the rightmost child has been explored. If the rightmost child has not been explored, the method 800 follows line 818 to block 820. In block 820, the rightmost child is added to the list and the method 800 follows line 812 to block 826. If the rightmost child has been explored, the method 800 follows line 822 to block 824. The leftmost unexplored child is then added to the list, as denoted by block 824. In block 826, the system determines if the list includes k entries, where k is the number of entries requested. If the list does include k entries, the method 800 follows line 828 and ends in block 830. If the list does not include k entries, the method 800 follows line 832 to block 804, where the method continues as previously described.

Another example of a probing algorithm to find a diverse set of unscored results is provided in Algorithm 2. The pseudocode for the corresponding data structure appears in Algorithm 3. The probing algorithm maintains a Dewey tree of its own. In particular, the tree it maintains will always be a subset of the nodes in the Dewey tree containing all possible answers. When this tree has k leaves (corresponding to k results), the algorithm is finished. The main driver of the probing algorithm simply makes repeated calls to getProbeId( ) which returns potential IDs to add in the list. The driver then calls next on the mergedList, and adds the result to the diversity data structure. It repeats this until a top-k list is obtained, or there are no more results.

Algorithm 2 Driver for Unscored Probing Algorithm

```
1: id = mergedList.next(0, LEFT)
2: root = new Node(id, 0, LEFT)
3: (probeID, dir) = root.getProbeId( )
4: while (root.numItems( )<k && probeId ≠ NULL)
5:    id = mergedList.next(probeId, dir)
6:    root.add(id, dir)
7:    (probeID, dir) = root.getProbeId( )
8: return root.getItems( )
```

Figure 7:
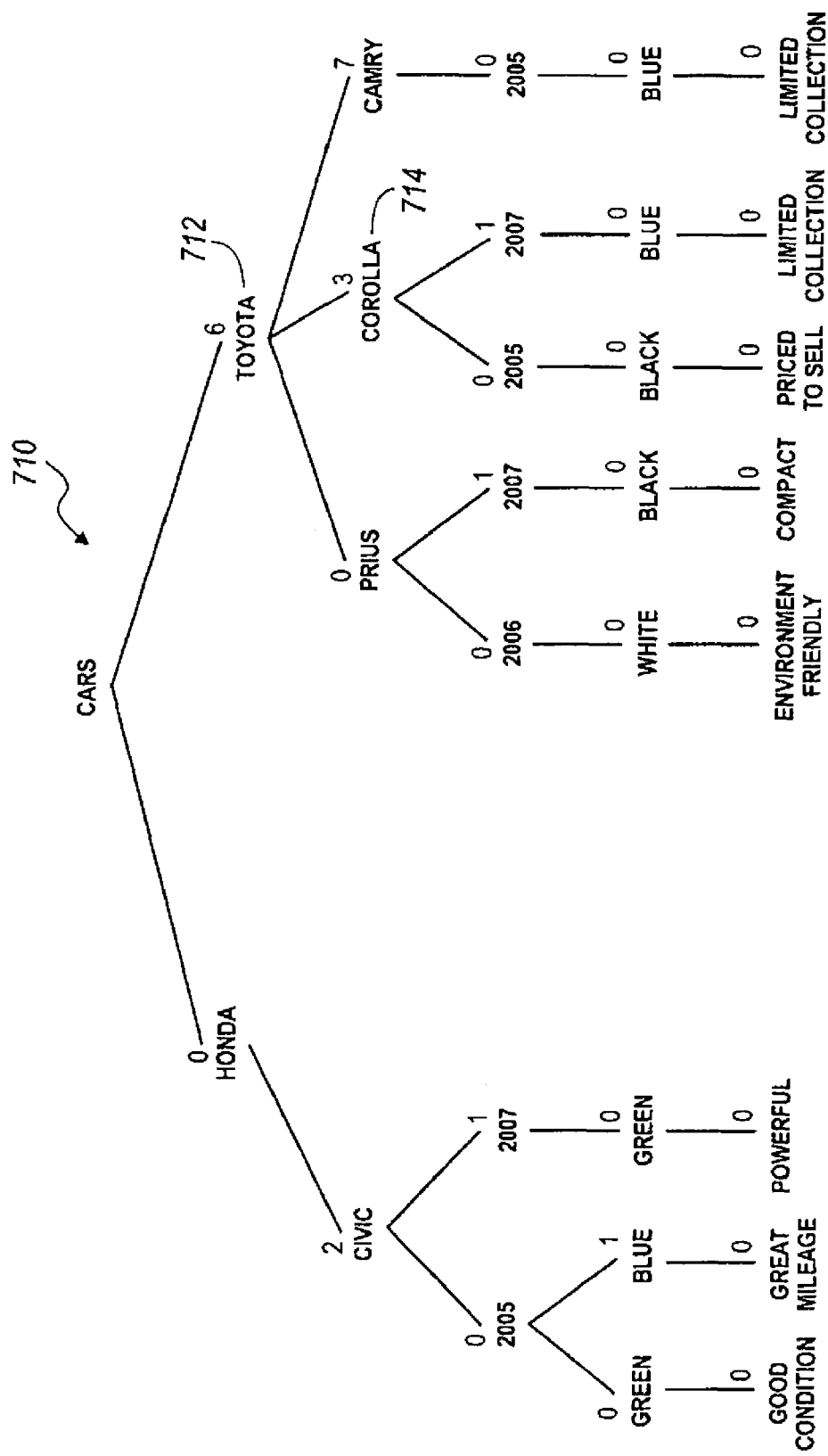
FIG. 7 is an exemplary tree diagram generated by a probing algorithm for the car relation.

Now, suppose a query Q is provided, and diverse a top-k list is requested. It will be helpful to think of the set of all possible answers to the query, arranged in a Dewey tree. For example, suppose that the possible answers are arranged in Dewey tree 710, as provided in FIG. 7. Notice that certain Dewey IDs do not appear in the tree 710, e.g. there is no 0.1.0.0.0, since in general not all items will satisfy query Q. For convenience, we will say that an ID, id belongs to a node, node1, written id ∈ node1, if the node corresponding to id lies in the subtree rooted at node1. For example, 6.3.1.0.0 belongs to the "TOYOTA" node 712 in FIG. 7. (It also belongs to the "Corolla" node 714 among others.

Algorithm 3 Data Structure for Unscored Probing

```
1: Initialize id = nid, level = lev and children to empty.
2: if (isLeaf(level)) then mark as DONE
3: else
4:    edge[dir] = nextId(id, level+1, dir)
5:    nextDir = toggle(dir)
6:    edge[nextDir] = extremeId(id, level+1, nextDir)
7:    children.add(newNode(id, level+1, dir)) Get probeId:
      (getProbeId( ))
Get probeId: (getProbID( ))
1: if (edge[LEFT] _edge[RIGHT]) then
2:    return (edge[nextDir], nextDir)
3: while (there are children that are not marked DONE)
4:    minChild = child with the minimum number of items,
         ignoring children that are marked DONE;
5:    return minChild.getProbeId( ) if it is not NULL
6: mark as DONE
Adding a result: (add(id, dir))
1: if (marked as DONE) then return
2: child = child in children corresponding to id
3: if (child ≠ NULL) child.add(id, dir)
4: else children.add(new Node(id, level+1, dir))
5: if (edge[LEFT] _edge[RIGHT])
6:    edge[dir] = getNextId(id, level+1, dir)
7:    nextDir = toggle(dir)
```

Figure 9:
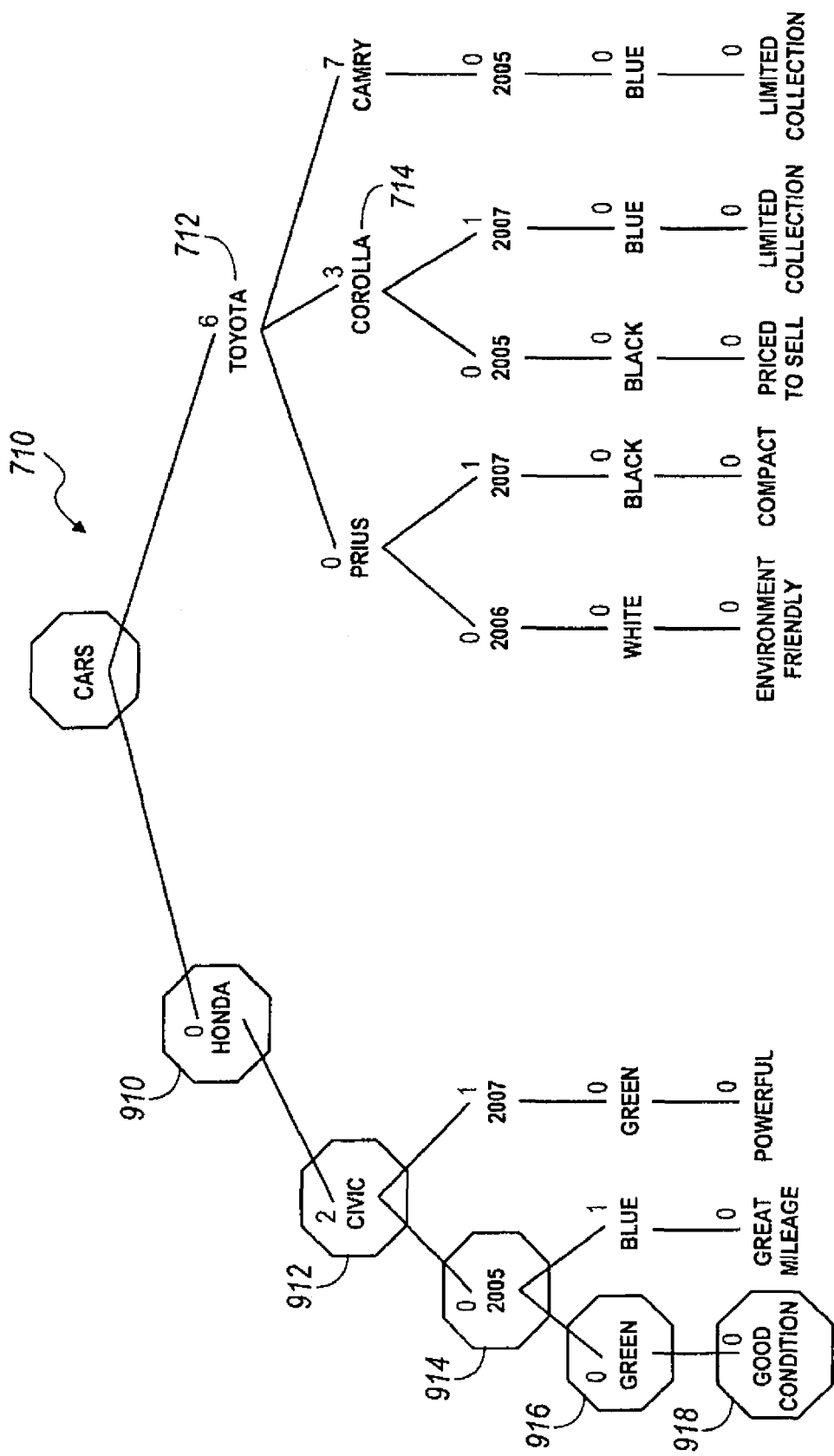
FIG. 9 is an exemplary tree diagram for the probing algorithm highlighting a selected branch.

The algorithm first calls id=mergedList.next(0, LEFT). This simply returns the first id≧0 (moving from left to right) that appears in mergedList. In this example, id is 0.2.0.0.0. The system initializes root=new Node(id, 0, LEFT). In so doing, the system creates a tree consisting of five nodes, one for each level of the Dewey tree. (These nodes 910, 912, 914, 916, and 918 are highlighted in FIG. 9.) Each of these nodes also initializes edge[LEFT] to id, incremented at the appropriate level (line 4 of the initializer). For instance, the root node initializes edge[LEFT]=1.0.0.0.0, while its child initial- izes edge[LEFT]=1.3.0.0.0. Each node also initializes edge [RIGHT] to some large Dewey ID, which is conceptually the largest possible ID belonging to that node (line 6 of the initializer). Suppose that no Dewey ID has an entry greater than 9. Then the system can set root.edge[RIGHT]=9.9.9.9.9, edge[RIGHT]=0.9.9.9.9 for its child, edge[RIGHT]= 0.2.9.9.9 for its grandchild, and so on. Think of these edge values as left and right boundaries, where all unexplored branches of a node lie between the values. In fact, the following invariant may be maintained:

Whenever id ∈ node, either id belongs to some child of node in the data structure, or node.edge[LEFT]id node.edge [RIGHT].

Figure 10:
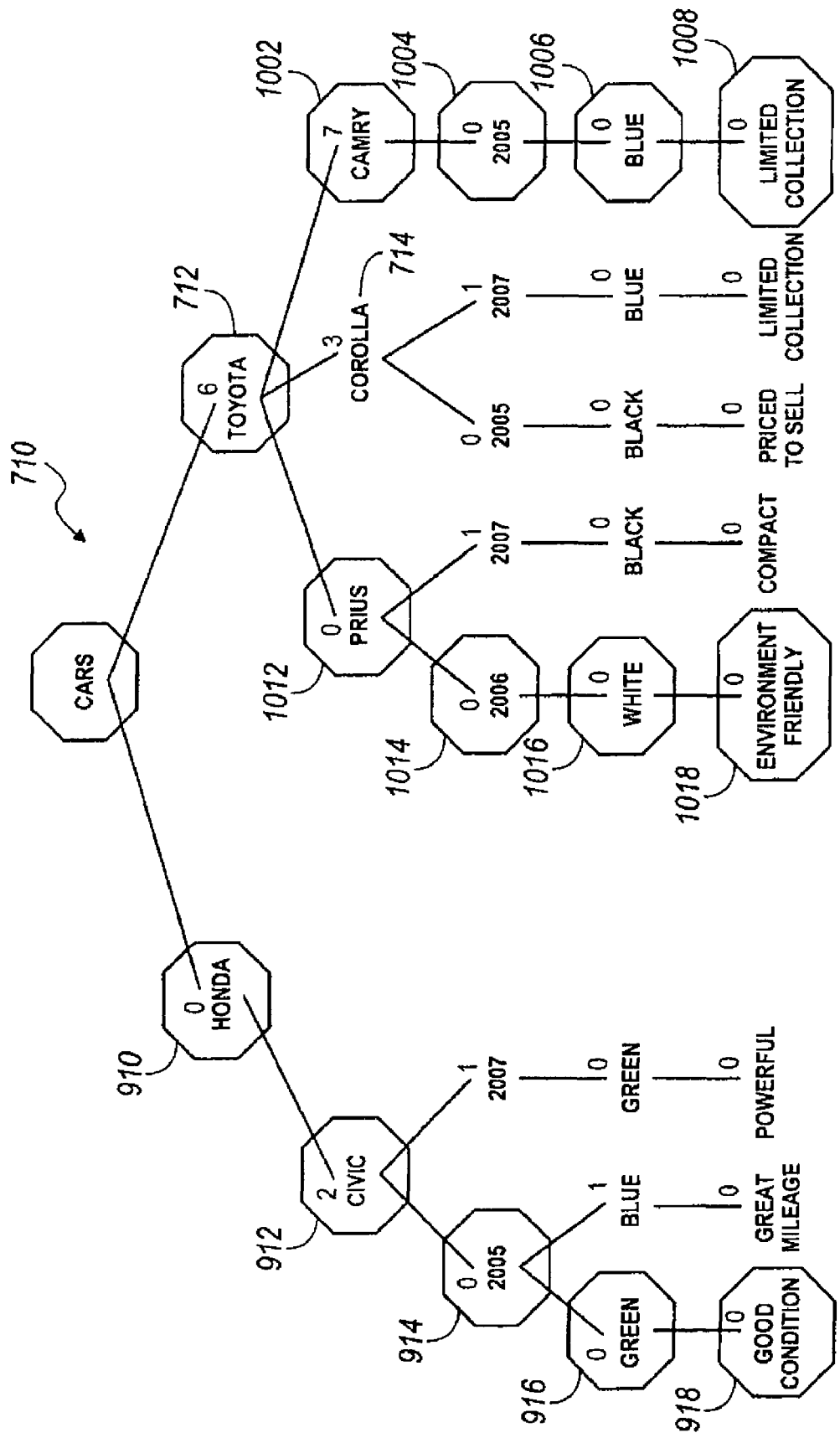
FIG. 10 is an exemplary tree diagram for the probing algorithm highlighting multiple selected branches.

Next, the call to root.getProbeId( ) will return (9.9.9.9.9, RIGHT) (line 3 of the driver). Hence, the call to mergedList. next(9.9.9.9.9, RIGHT) returns the largest id≦9.9.9.9.9 (moving from right to left) that appears in mergedList. In the example, id is 6.7.0.0.0. When this result is added to the tree, the values edge[RIGHT] are initialized to id, decremented at the appropriate level, while the values of edge[LEFT] are set to be the smallest IDs possibly belonging to each node (712, 1002, 1004, 1006, and 1008, in FIG. 10) unless the value has already been set. So, root.edge[RIGHT]=6.7.0.0.0, while its right child (labeled "Toyota") sets edge[RIGHT]=6.7.0.0.0 and edge[LEFT]=6.0.0.0.0.

For the third probe (and the second call to getProbeId( ) line 7 of the driver), the system return (1.0.0.0.0,LEFT). Hence, id is subsequently set to 6.0.0.0.0. When we add this result, root.edge[LEFT] is set to 7.0.0.0.0. For the first time, root.edge[LEFT]>root.edge[RIGHT], indicating that every child of root has at least one result added to it. (The set of nodes 712, 1012, 1014, 1016, and 1018 in the tree 710 is highlighted in FIG. 10.) Notice that two results have been added to the "Toyota" node 712 and only one to the "Honda" node 910. However, it is not hard to see that such an imbalance cannot be greater than one item, since the next iteration will necessarily add to the child with the fewest results.

The next call to root.getProbeId( ) does not simply return edge[ ], since root.edge[LEFT]>root.edge[RIGHT]. (Root being in the second phase of exploration.) Instead, it sets minChild to be the child with the fewest results (in this case, the child labeled "HONDA") and calls getProbeId( ) on min- Child (line 5 of getProbeId( ). Notice that minChild will explore from the RIGHT (since the last real result added to it came from the LEFT). The next result added to the data structure will thus be 0.2.1.0.0. At this point, the advantages can be seen of calling next moving in both directions, rather than just left to right. Notice that in the full Dewey tree of possible answers, the "Honda" node 910 has just a single child. In the system's calls using LEFT and RIGHT, the single child is found automatically. However, an algorithm using only calls to next(, LEFT) would need to check whether "Honda" had additional children, wasting a call to next. In extreme cases, (say, if "CIVIC" had only one child), such an algorithm would waste even more calls to next.

On the other hand, the probing algorithm guarantees that calls to next always result in an id that stays in the correct subtree. A little more formally, the following invariant may be maintained:

Let node be some node in the data structure, and suppose during the execution of the algorithm, node.getProbeId ( ) is called, returning (probeId,dir). Then mergedList. next(probeId, dir)∈ node.

Even more importantly, every time a call to next is made, it results in an id that is part of the diverse set, unless it has already been added to the structure. It is not necessary to remove a result that has been added. In fact, the unscored probing algorithm given in Algorithms 2, 3 makes at most 2k calls to next.

Notice that the running time per call to the data structure is at most O(d). At first glance, it appears that we need to maintain a heap to find the child with the smallest number of results (line 4 of getProbeId( )). However, since results are added to the set in a regular fashion, the system can actually maintain the information needed using a circular list.

The probing-based algorithm in the scored case is very similar to the unscored case. The pseudocode for the driver routine is given in Algorithm 4.

The first stage of the algorithm may call WAND to obtain an initial top-k list. (However, any score-based algorithm to find a top-k list is sufficient.)

Let θ be the score of the lowest-scoring item in the top-k list returned. Every result that is strictly greater than θ, is kept. Notice that every call to next uses threshold value θ, hence is very similar to unscored probing. Algorithm 4 Driver for Scored Probing Driver Routine:

---
Algorithm 4 Driver for Scored Probing
---
1: Run WAND to obtain a top-k list, List.
2: Let θ be the lowest score in that list.
3: Let maxid be the item in List with the highest score.
4: root = new Node(maxid, 0, MIDDLE)
5: For each item 2 List such that score(item) > θ:
6:   root.add(item, MIDDLE)
7: (probeID, dir) = root.getProbeID( )
8: while ( root.numItems( ) < k && probeID ≠ NULL)
9:   currID = mergedList.next(probeID, dir, θ)
10:  root.add(currID, dir)
11:  (probeID, dir) = root.getProbeID( )
12: return root.returnResults( )
---

It is the initial insertions that make the algorithm more complicated. As we can see on line 6 of Algorithm 4, each of the items inserted initially is marked MIDDLE, indicating that it does not give any information about edge[LEFT] or edge[RIGHT]. In the unscored case, every id obtained was a useful result to add (unless it had already been added). However, in the scored case, an id may be obtained that does not help, due to the fact that many items have been inserted in a non-regular fashion. In order to deal with this, some ids to be inserted tentatively.

During the call to add(id, dir), the data structure checks whether id actually is useful or not. If it is useful, it is added normally. If not, it is cached as a tentative ID. When the algorithm later calls getProbeId( ) it checks whether any cached IDs would be helpful. If so, it returns it (along with direction MIDDLE, indicating that the call to next(probeId, MIDDLE) should simply return probeId with no addition work).

It is possible to show that the number of tentative items is never more than 2k', where k' is the number of items with score strictly greater than a In fact, even in the scored probing algorithm, at most 2k calls to next are made (ignoring calls with MIDDLE).

The asymptotic running time of this algorithm is not impacted by maintaining these tentative values. However, in order to find the child with the fewest results (corresponding to line 4 of getProbeId( ) in the unscored version), a heap is maintained. Hence, the worst-case running time for each operation is O(d lg k).

Figure 11:
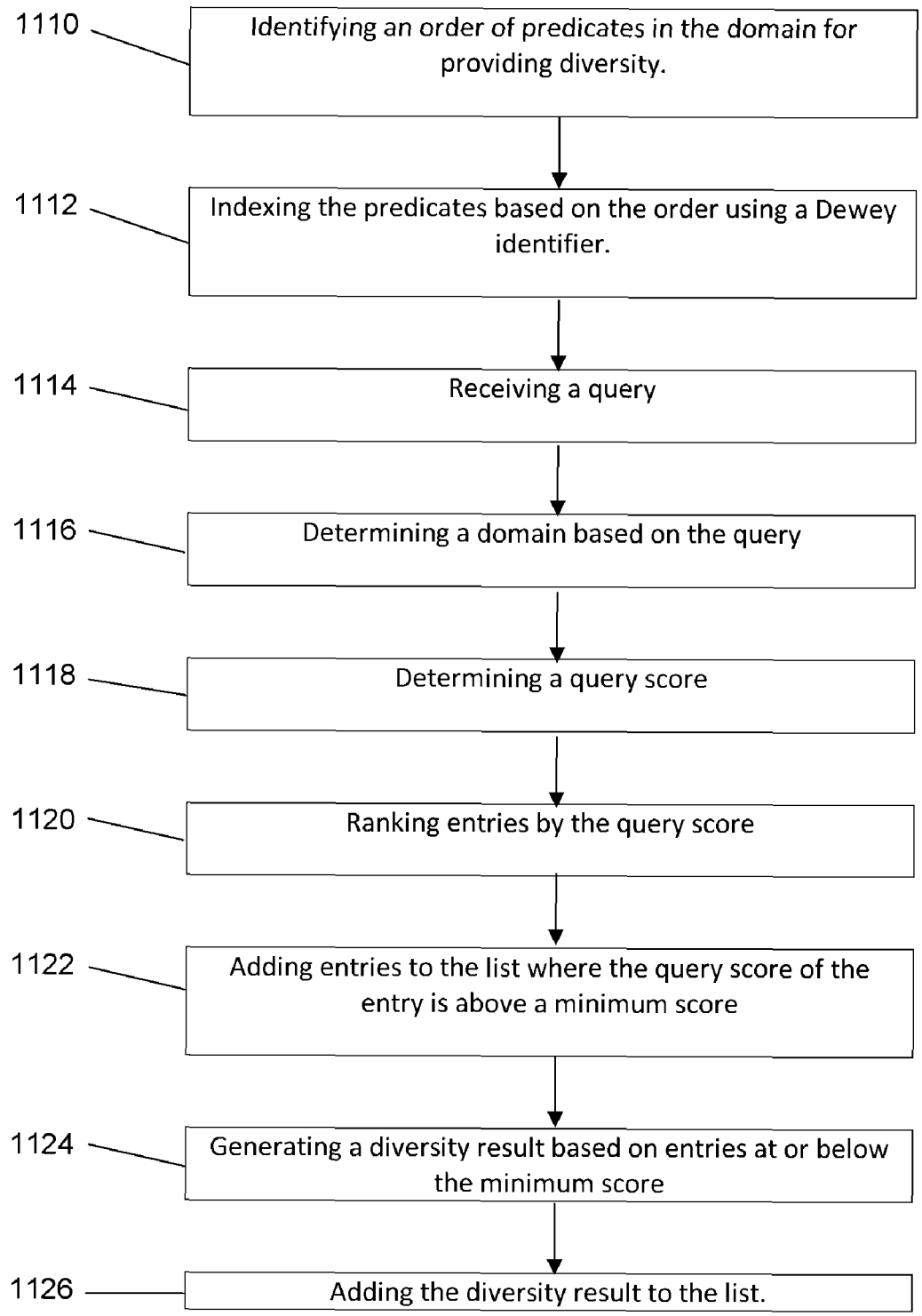
FIG. 11 is a flowchart illustrating one method for increasing diversity.

FIG. 11 illustrates one method for increasing diversity. In block 1110, an order of predicates in the domain are identified for providing diversity. In block 1112, the predicates are indexed based on the order using a Dewey identifier. In block 1114, a query is received. In block 1116, a domain is determined based on the query.

In blocks 1118-1128, entries are selected for the list by varying at least one predicate, thereby including a proportional representation of each available predicate value that matches the query for the at least one predicate. In block 1118, a query score is determined In block 1120, entries are ranked by the query score. In block 1122, entries are added to the list where the query score of the entry is above a minimum score. In block 1124, a diversity result is generated based on entries at or below the minimum score. In block 1126, the diversity result is added to the list.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A method for generating a list for display to a user, the method comprising the steps of:
    receiving a query;
    determining a domain based on the query, wherein the domain has a plurality of predicates associated with the domain;
    determining a query score;
    ranking entries by the query score;
    adding entries to the list where the query score of the entry is above a minimum score;
    generating a diversity result based on entries at or below the minimum score and selecting entries for the list by varying at least one predicate of the plurality of predicates, wherein an order of the predicates follow a predefined hierarchy and higher order predicates are varied at least as much as lower order predicates, thereby including a proportional representation of each available predicate value for the at least one predicate that matches the query, where the diversity result is generated by a computer, wherein a unique integer identifier is assigned to each predicate value within a level of the hierarchy and further comprising indexing through the unique integer identifiers for the plurality of predicates based on the order; and adding the diversity result to the list.

2. The method according to claim 1, wherein the plurality of predicates are indexed using a Dewey identifier.

3. The method according to claim 1, wherein generating the diversity result is performed using a one-pass algorithm.

4. The method according to claim 1, wherein generating the diversity result is performed using a probing algorithm.

5. A system for generating a list for display to a user, the system comprising:

a computer;

a query engine configured to receive a query from the user through an internet connection and determine a domain based on the query, wherein the domain has a plurality of predicates associated with the domain; and an advertisement engine being executed by the computer and in communication with the query engine, the advertisement engine selecting entries for the list, wherein each entry includes a query score and the advertisement engine is configured to rank the entries by the query score, add entries to the list where the query score of the entry is above a minimum score, generate the diversity result based on entries at or below the minimum score, and add the diversity result to the list, further wherein entries are selected for the diversity list by varying at least one predicate of the plurality of predicates, wherein an order of the predicates follow a predefined hierarchy and higher order predicates are varied at least as much as lower order predicates, thereby including a proportional representation of each available predicate value for the at least one predicate that matches the query, wherein a unique integer identifier is assigned to each predicate value within a level of the hierarchy and further comprising indexing through the unique integer identifiers for the plurality of predicates based on the order.

6. The system according to claim 5, wherein the plurality of predicates are indexed using a Dewey identifier.

7. The system according to claim 5, wherein advertisement engine includes a one-pass algorithm to generate the diversity result.

8. The system according to claim 5, wherein advertisement engine includes a probing algorithm to generate the diversity result.

9. A computer readable storage medium having stored therein instructions executable by a programmed processor for generating a list, the storage medium comprising instructions for:

receiving a query determining a domain based on the query, wherein the domain has a plurality of predicates associated with the domain;

determining a query score;

ranking entries by the query score;

adding entries to the list where the query score of the entry is above a minimum score;

generating a diversity result based on entries at or below the minimum score and selecting entries for the list by varying at least one predicate of the plurality of predicates, wherein an order of the predicates follow a predefined hierarchy and higher order predicates are varied at least as much as lower order predicates, thereby including a proportional representation of each available predicate value for the at least one predicate that matches the query, where the diversity result is generated by a computer, wherein a unique integer identifier is assigned to each predicate value within a level of the hierarchy and further comprising indexing through the unique integer identifiers for the plurality of predicates based on the order; and adding the diversity result to the list.

10. The computer readable storage medium according to claim 9, wherein the plurality of predicates are indexed using a Dewey index.

11. The computer readable storage medium according to claim 9, wherein generating the diversity result is performed using a one-pass algorithm.

12. The computer readable storage medium according to claim 9, wherein generating the diversity result is performed using a probing algorithm.

* * * * *